(12) United States Patent
Law et al.

(10) Patent No.: US 12,285,888 B2
(45) Date of Patent: Apr. 29, 2025

(54) INDUCTION HEATED TOOLING AND METHODS OF USING THE SAME

(71) Applicant: Meggitt Aerospace Limited, Coventry (GB)

(72) Inventors: Ka Yan Law, Southampton (GB); Cameron Malcolm Graham Ross, Crick (GB)

(73) Assignee: MEGGITT AEROSPACE LIMITED, Coventry (GB)

( * ) Notice: Subject to any disclaimer, the term of this patent is extended or adjusted under 35 U.S.C. 154(b) by 74 days.

(21) Appl. No.: 18/153,200

(22) Filed: Jan. 11, 2023

(65) Prior Publication Data
US 2024/0227250 A1 Jul. 11, 2024

(51) Int. Cl.
| | |
|---|---|
| *B29C 43/02* | (2006.01) |
| *B29C 33/38* | (2006.01) |
| *B29C 33/40* | (2006.01) |
| *B29C 35/08* | (2006.01) |
| *B29C 43/00* | (2006.01) |
| *B29C 43/36* | (2006.01) |
| *B29C 43/52* | (2006.01) |
| *B29C 64/10* | (2017.01) |
| *B33Y 10/00* | (2015.01) |
| *B29C 33/06* | (2006.01) |

(Continued)

(52) U.S. Cl.
CPC ...... *B29C 35/0805* (2013.01); *B29C 33/3842* (2013.01); *B29C 33/40* (2013.01); *B29C 43/003* (2013.01); *B29C 2035/0811* (2013.01); *B29C 2035/0816* (2013.01); *B29K 2083/00* (2013.01); *B29K 2879/085* (2013.01); *B33Y 80/00* (2014.12); *H05B 6/106* (2013.01); *H05B 6/362* (2013.01); *H05B 2206/02* (2013.01)

(58) Field of Classification Search
CPC ............... B29C 33/06; B29C 33/3842; B29C 2035/0811; B29C 2035/0816; B29C 43/003; B29C 43/02; B29C 43/36; B29C 43/52; B29C 64/10; B29K 2083/00; B29K 2879/085; B33Y 10/00; F28D 15/00; F28F 13/00; F28F 23/00; H05B 6/02; H05B 6/106; H05B 6/362; H05B 2206/02
USPC ........... 264/219, 308, 320, 325, 331.11, 337, 264/403, 486; 425/174.8 R, 470; 249/78, 249/79, 80, 134; 219/600, 672, 675; 165/104.15, 185

See application file for complete search history.

(56) References Cited

U.S. PATENT DOCUMENTS

| | | |
|---|---|---|
| 2,626,428 A | 1/1953 | Bosomworth |
| 3,616,495 A | 11/1971 | Lemelson |

(Continued)

FOREIGN PATENT DOCUMENTS

| | | | |
|---|---|---|---|
| KR | 20190138155 A | 12/2019 | |
| WO | WO-03060035 A1 * | 7/2003 | ............... F28F 13/00 |

*Primary Examiner* — Leo B Tentoni
(74) *Attorney, Agent, or Firm* — Orbit IP, LLP (57) ABSTRACT

A method of curing a part in a mold using induction heated tooling is provided. In preferred embodiments, the method comprises placing a material that may be cured with pressure and heat in tooling made from a non-metallic material wherein the tooling includes a mold cavity that forms the part. Creating an electro-magnetic field across the tooling using induction coils. Applying pressure to the tooling and heating a metallic material contained in channels formed in the tooling around the mold cavity of the part.

18 Claims, 9 Drawing Sheets

(51) Int. Cl.
  *B29K 83/00* (2006.01)
  *B33Y 80/00* (2015.01)
  *F28D 15/00* (2006.01)
  *F28F 13/00* (2006.01)
  *F28F 23/00* (2006.01)
  *H05B 6/02* (2006.01)
  *H05B 6/10* (2006.01)
  *H05B 6/36* (2006.01)

(56) References Cited

U.S. PATENT DOCUMENTS

| | | | |
|---|---|---|---|
| 5,599,472 | A | 2/1997 | Brown et al. |
| 5,849,238 | A * | 12/1998 | Schmidt ................ B29C 64/165 |
| | | | 264/219 X |
| 6,091,063 | A | 7/2000 | Woods |
| 6,241,929 | B1 | 6/2001 | Akopyan |
| 8,794,950 | B2 | 8/2014 | Feigenblum et al. |
| 8,941,036 | B2 | 1/2015 | Okada et al. |
| 9,566,721 | B2 | 2/2017 | Waeckerle et al. |
| 10,173,379 | B2 | 1/2019 | Feigenblum et al. |
| 10,220,584 | B2 | 3/2019 | Seroka |
| 11,040,466 | B2 | 6/2021 | Haibach et al. |
| 2004/0058027 | A1 | 3/2004 | Guichard et al. |
| 2017/0036310 | A1 | 2/2017 | Matsen et al. |
| 2022/0088838 | A1 | 3/2022 | Feigenblum |

* cited by examiner

INDUCTION HEATED TOOLING AND METHODS OF USING THE SAME

FIELD

The present patent document relates to induction heated tooling and improved methods for curing materials in molds.

BACKGROUND

The manufacturing of numerous different products includes curing the material in compression molding. Compression molding is a manufacturing process where a measured amount of molding material that's generally heated (typically referred to as a charge) is compressed into the desired form using heated molds. Common materials used in compression molding include but are not limited to: Diallyl phthalate (DAP); Epoxy; High-density polyethylene (HDPE); Melamine; Polyamide-imides (PAIs); Polyether ether ketone (PEEK); Polyurethane (PU); Polyphenylene sulfide (PPS); Phenolic resins (PF); Polytetrafluoroethylene (PTFE); Silicone; Urea-formaldehyde (UF); Urethane; organic rubbers and composite materials.

One application of compression molding is the manufacture of polymer seals. Polymer seals are manufactured by compression molding where the polymer is placed in the cavity formed by two or more mold sections and usually heated between two heated metallic platens. The heat is conducted through the platen, into the metallic mold and then into the polymer to cure it. The cycle times for heating large metallic molds is long as the heat is required to conduct through the platen and the mold tool.

To this end, there is a need in the industry for a more efficient way to manufacture parts using compression molds. In particular, there is a need to reduce the cost, time and energy needed to manufacture parts using compression molding.

SUMMARY OF THE EMBODIMENTS

One object of the present patent document is to provide an improved method of manufacturing using compression molds. In particular, one object of the present patent document is to use an induction heated mold designed to better cure the parts being manufactured using molds. Another object is to create molds that can be induction heated for use in the process of curing parts. To this end, the embodiments herein seek to reduce the cost, time and energy required to cure parts using a mold and in particular, a compression mold.

To these ends, a method of curing a part in a mold is provided. The method of curing a part in a mold comprises placing a material that may be cured with pressure and heat in tooling made from a non-metallic material. The tooling includes a mold cavity that forms the part. Once the non-metallic material is loaded in the tooling an electro-magnetic field is generated across the tooling using induction coils. The tooling is also pressed to apply pressure. The electro magnetic field (EMF) heats a metallic material contained in channels formed in the tooling around the mold cavity of the part and the part is cured.

In preferred embodiments, the tooling is used to make polymer seals and the material loaded in the tooling is a silicone polymer. Of course, other materials may be used depending on the type of part desired.

Because it may be desirable to have a complex system of channels, the tooling is preferably manufactured using additive manufacturing.

The metallic material placed within the channels of the tooling may be iron filings. It may also be small balls, random shaped particles or powder consisting of any suitable metallic material. The metallic material may be mixed or back-filled with a binding agent to hold it in place and enhance the metal to mold conduction path. One binding agent is an epoxy resin.

The tooling must be made from a non-metallic material and is preferably made from plastic. One type of non-metallic material that may be used is Polyether Imide.

The channels within the tooling may take on various different designs and different part shapes may require different designs. In some embodiments, the channels are a continuous spiral. In other embodiments, the channels are placed on one side of the part only.

In some embodiments, the tooling is comprised of two halves and one half has all the channels.

In another aspect of the invention, tooling for curing a part is provided. In preferred embodiments, the tooling comprises, a body made from a non-metallic material, wherein the body is comprised of at least two mating pieces. The body includes a mold cavity within the body wherein the mold cavity forms the part. The tooling further includes a plurality of channels formed on at least one side of the mold cavity and filled with a metallic material supported by a binding agent.

DETAILED DESCRIPTION OF THE DRAWINGS

Figure 1:
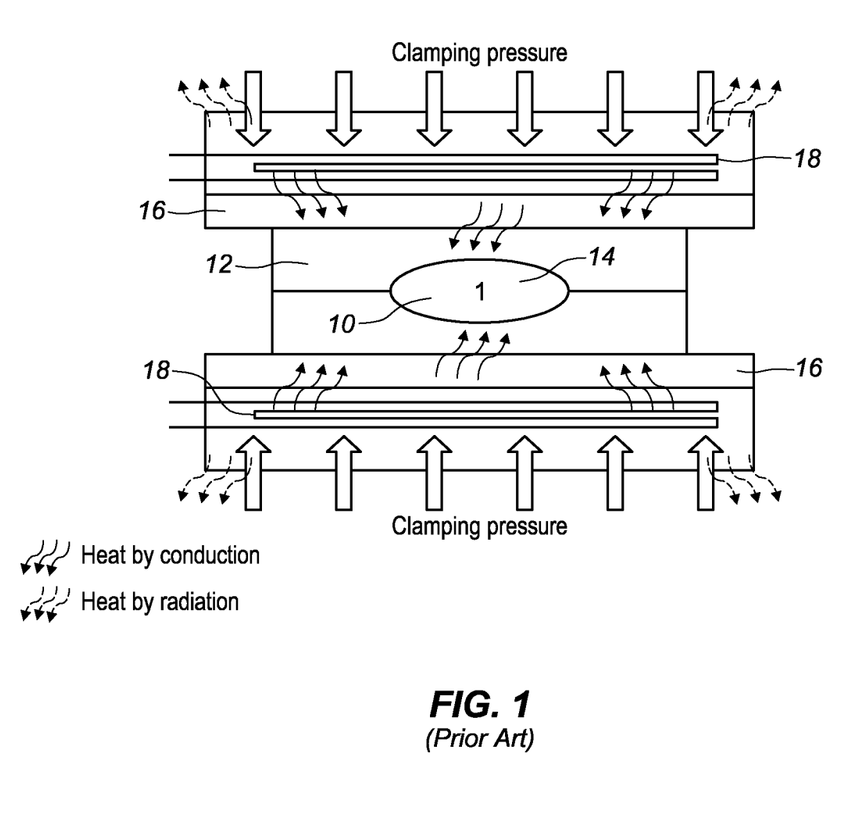
FIG. 1 illustrates a diagram of the currently known conventional method for curing a part during a compression mold manufacturing process.

As may be seen in FIG. 1, the known method of curing a part 10 in a mold 12 starts by positioning the material to be molded in the mold 12 cavity 14 and the heated platens 16 are closed by a hydraulic ram. The material is conformed to the mold form by the applied pressure and heated until the curing reaction occurs. The mold 12 may then be cooled and the part 10 removed, or the part 10 may be removed whilst still hot depending on specific factors.

Materials may be loaded into the mold either in the form of a pre-formed billet, or sheet, or the mold may be loaded from a plasticating extruder. Materials are heated above their melting points, formed and cooled.

The conventional methods use metallic molds 12 and the heat is transferred from the heated platens 16 through the metallic mold 12 into the material which forms the part 10. As may be appreciated from FIG. 1, the platens are typically heated using resistant coils 18 and hence, resistance heating, in some cases machines use conductive coils heating a metal platen 16. The primary heat transfer mechanism from the heat source 18 into the part 10 is conduction. Alternatively, steam heated platens are sometimes used.

Figure 2:
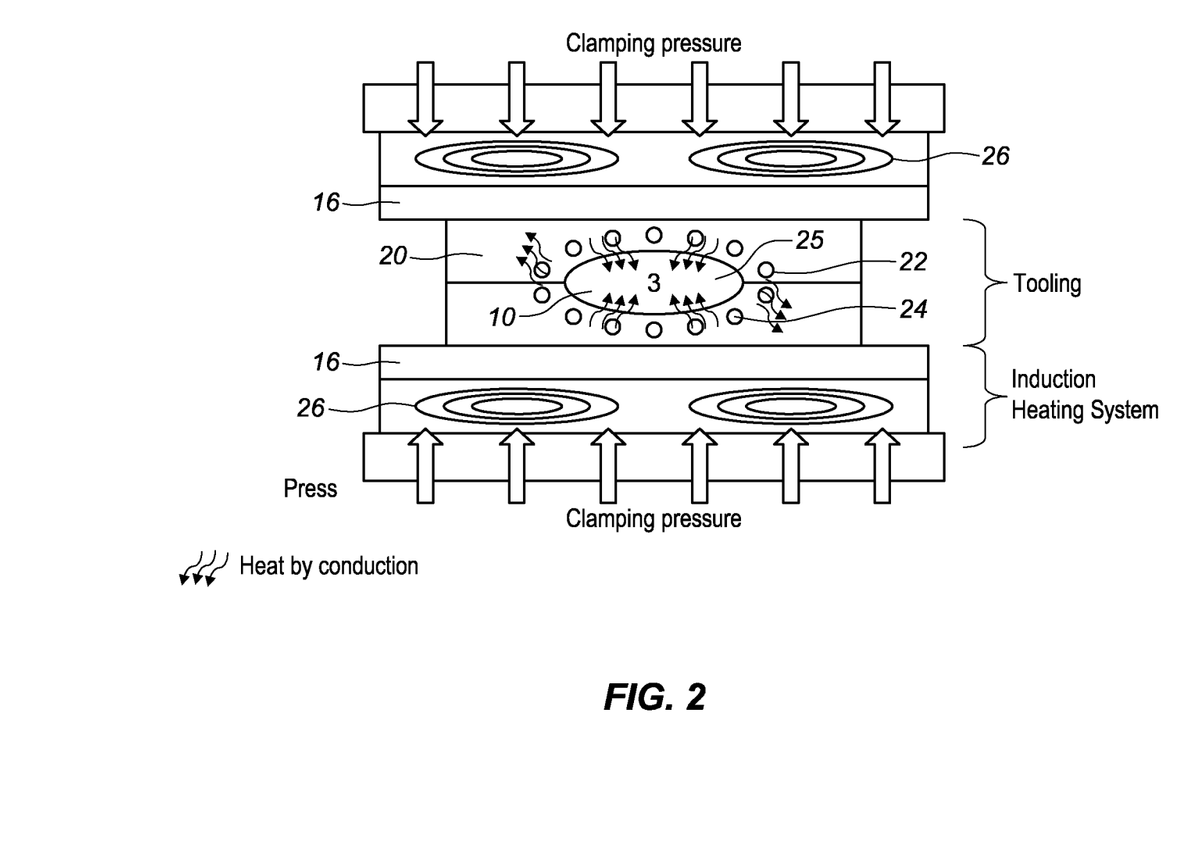
FIG. 2 illustrates a diagram of a new method that uses induction heated molds for curing a part during a compression mold manufacturing process.

FIG. 2 illustrates a diagram of a new method that uses induction heated tooling 20 for curing a part 10. In preferred embodiments, the induction heated tooling 20 are used as part of a compression mold manufacturing process but their use is not so limited and the induction heated tooling 20 may be used as part of any process that needs to cure a material by adding heat.

The material used to make the induction heated tooling 20 must be unresponsive to any Electro Magnetic Field ("EMF"). The material used for the induction heated tooling 20 should be 3d printable and able to withstand the curing temperature of the product(s) to be formed with the tooling 20. In preferred embodiments, the induction heated tooling 20 is non-metallic. In some embodiments, the induction heated tooling 20 is plastic. However, other non-metallic materials may be used to make the tooling 20 such as ceramic or hard rubber to name a few. Generally, any material that is transparent to the EMF, 3D printed, and can withstand the high pressures and temperatures may be used for construction of the tooling 20. In some embodiments, a polyetherimide (PEI) thermoplastic $(C_{37}H_{24}O_6N_2)_n$ is used. In particular embodiments, Ultem 1010™ may be used. Ultem 1010 can withstand the curing temperatures of silicone without any distortion to the molds. Ultem 1010™ is available from Sabic currently at https://www.sabic.com/en/products/specialities/ultem-resins/ultem-resin. Ultem 1010 has been demonstrated as a preferred material for making polymer molds because previous 3D printed Ultem 1010 tools have proven that the material meets the requirements of the polymer seal manufacturing process such as temperature, pressure and ability to achieve surface finish.

In preferred embodiments, the tooling 20 is made using the additive manufacturing ("AM") process. AM allows channels 22 to be created in the tooling 20. As will be explained herein, the channels 20 are a critical feature of the tooling 20. Moreover, AM allows complex channel geometries 22 to be created in the tooling 20. Although AM is the preferred method for making the tooling 20, other methods may be used. As just one example, traditional CNC machining may be used but one skilled in the art will appreciate that less complex channels may be created using traditional machining processes.

In addition to creating complex channel 22 geometries, heating of the tooling 20 may be controlled by the density and layout of the channels 22. Increasing the density of the channels in a particular location will increase the heat to that particular portion of the tooling 20. In addition, to the channel density, the heating of the tooling may be affected by the filing density of the metallic substance in the channels 22. For example, the channels 22 are typically filled with a working substance that responds to the magnetic flux and a filler. By controlling the ratio of the working substance to filler in different portions of the channels, the heat to the tooling can be controlled. The more filler that is used, the less heat that will result from the magnetic flux.

The heating may also be controlled by turning the magnetic flux on and off to different portions of the tooling. The heating of the tooling results from the magnetic flux and by adjusting the magnetic flux on and off to different portions of the tooling 20 or by increasing the strength of the magnetic flux to different portions of the tooling 20, the heating may also be controlled. As will be discussed below with respect to FIGS. 3 and 4, the heating of the tooling may also be adjusted by focusing the magnetic flux.

Similar to the molds 12, the tooling 20 includes at least one cavity 25 designed to form a part 10 when filled with a molding material and cured. Similar to the molds 12, the tooling preferably consists of mold pieces that are designed to mate together such that a portion of the cavity 25 is in each piece of the tooling 20 and the pieces mate together to allow the mold pieces of the cavity 25 to form the part.

The difference between the tooling 20 and the molds 10 is that the tooling 20 is created with a plurality of channels 22 that are designed to be responsive to an EMF. In preferred embodiments, after the tooling 20 is manufactured with the channels 22 from a material that is not responsive to an EMF, the channels 22 are filled with a metallic material to create a metallic filament 24. In preferred embodiments, iron is used to create an iron filament 24. However, any metallic material that will respond to an EMF may be used. Metallic pastes, iron filings, metallic 3-D printing powders, small ball bearings or shot or other metal filings such as copper may be used. In some embodiments, the metal may be mixed with a fluid to help it flow into the channels 22 and/or back-filled with an in-fill such as epoxy-resin which provides structural support and thermal conductivity from the metal to the mold.

As may be seen in FIG. 2, coils 26 are used to create an EMF across the tooling 20 and part 10. The induction heated system includes an induction coil within a press that produces a uniform magnetic field across the surface of the part 10. The shape of the magnetic field is dependent on the induction coil design and the strength is dependent on frequency and current supplied to the coil from the power supply.

Figure 3:
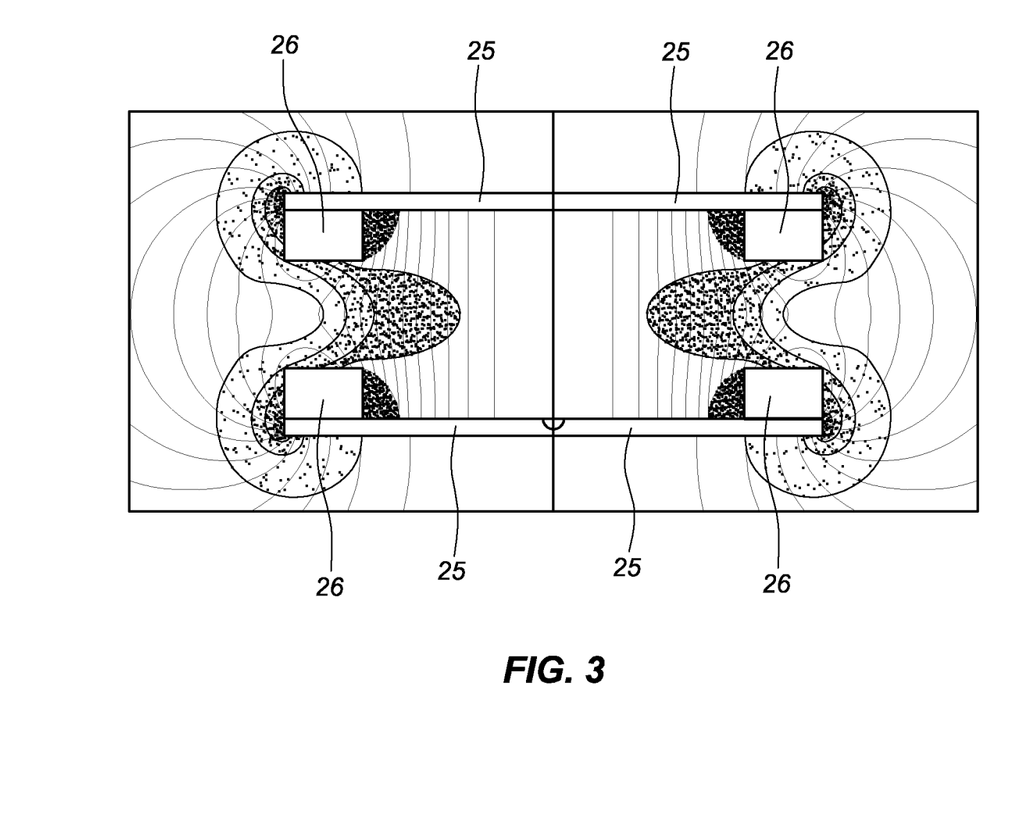
FIG. 3 illustrates a two-dimensional Ansys simulation of a circular induction coil for use in an induction heating system.

FIG. 3 illustrates a two-dimensional Ansys simulation of a circular induction coil for use in an induction heating system. Circular coils can provide heating for small press surface areas. As may be seen in FIG. 3, in some embodiments, metallic plates 25 may be used as a flux concentrator 25. In preferred embodiments, the plates 25 are made of steel and flux concentrators are typically made from Ferrite but other metals may be used. The metallic plates 25 concentrate the magnetic field within the plate 25 and direct the magnetic field to one side of the coil.

The larger the radius of the flux concentrator 25, the stronger the magnetic field between the concentrator 25. As the flux concentrator 25 increases in thickness, the magnetic flux of the coils 26 increases slightly.

Figure 4:
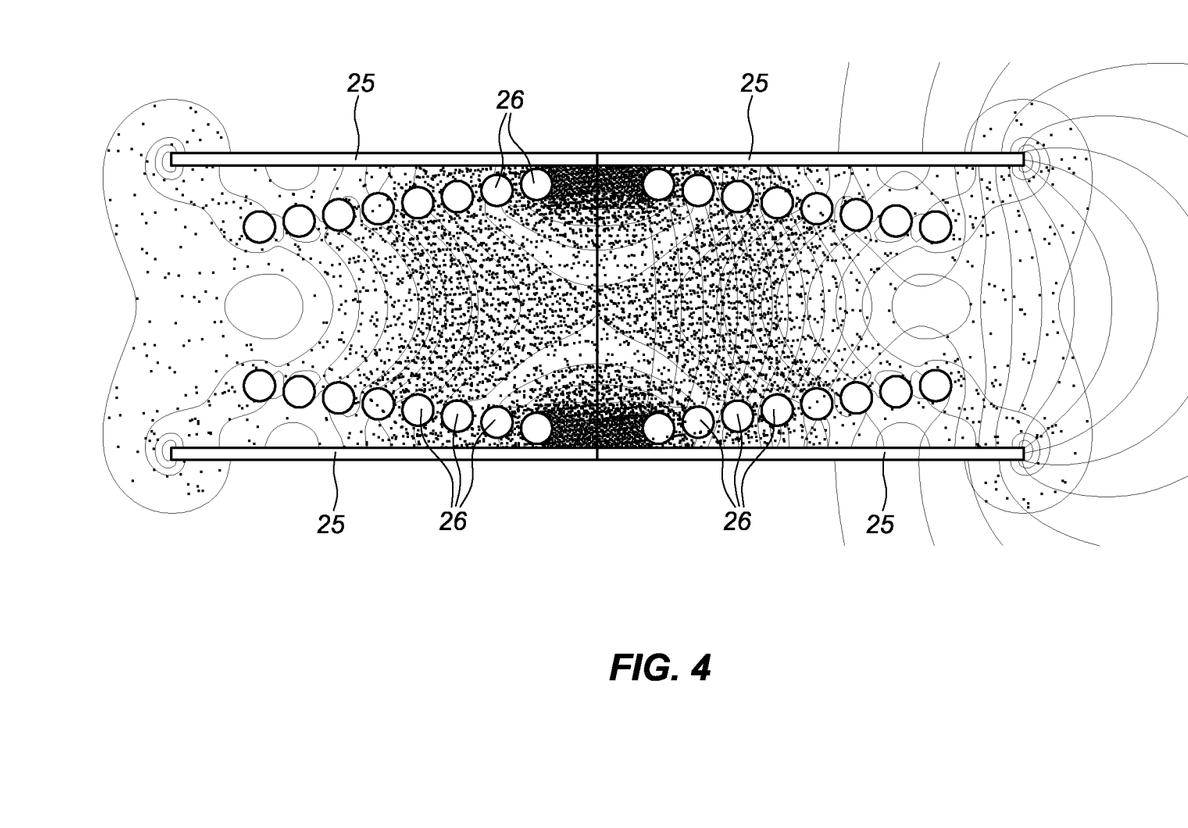
FIG. 4 illustrates a two-dimensional Ansys simulation of a cone-shaped pancake coil for use in an induction heating system.

FIG. 4 illustrates a two-dimensional Ansys simulation of a cone shaped pancake coil for use in an induction heating system. Pancake coils may be used for larger press surface areas. A pancake coil in a slight cone shape, as shown in FIG. 4, provides a more uniform magnetic field to be achieved at the center of the coil. Other geometries are equally applicable and techniques such as lensing may be used to focus the field in certain embodiments.

In preferred embodiments, the induction heated tools 20 have been 3D printed using AM. AM provides greater flexibility for producing complex geometries that may not be possible through traditional means.

In operation, an alternating current is supplied from a source to the induction heating system. The induction heating coils 26 generate an alternating magnetic field. When an electrically conductive material is placed within this magnetic field, such as the conductive material inserted into the channels 22, eddy currents are induced at the material surface and this causes the material to heat up. The magnetic permeability (how magnetic a material is) and the electrical conductivity governs how much magnetic energy is converted into heat. Non-magnetic metals can also be induction heated and in general, a material with greater electrical conductivity will heat up faster. Therefore, materials such as copper and aluminium with greater electrical conductivity will heat up faster. The conductive material also needs to be inserted into the channels. Copper and aluminium powder are difficult and expensive to source. Therefore, iron filings are an inexpensive choice, which conducts both electricity and magnetic flux. The iron filings may be mixed in with epoxy resin to allow improved pouring capabilities into the channels 22 as well as reduce the risk of overheating.

As described herein, particulate metal is preferably used to fill the channels 22. This particulate metal may be mixed with a resin, epoxy or other fluid. However, it is important to ensure the particles are metal to metal in contact to ensure the magnetic flux and eddy currents flow. Accordingly, any fill used in channels 22 must be dense enough in metal particulate to ensure sufficient contact between individual particulates of metal. In preferred embodiments, a ratio of 60% to 40% by volume metallic material to filler may be used. However, in other embodiments, other ratios of responsive material to filler may be used including 100% to 0%, 90% to 10%, 80% to 20% and 70% to 30% and other ratios in between. The metallic material, or material responsive to the magnetic field, may vary between 5% and 100% by volume.

The responsive material and filler may be premixed and then injected into the channels or the metallic material may be placed in first and then evacuated and followed by the filler material. Varying the fill ratio within a single piece of tooling 20 or even a single channel 22 may be used to moderate temperature concentration.

The channels 22 may take on any design or channel shapes within the tooling 20. The channels themselves may also have any shape cross section although a circular cross section is preferred. In a magnetic domain, the alignment of the conductive material relative to the magnetic flux is important.

Magnetic flux concentrates in reduced cross-sectional and 'focal' areas (such as radii or corners). Accordingly, it is important to minimise the use of these features in the channel designs. To this end, circular or oval cross-sections are preferred for the channels 22. More generally, curves are better than edges and/or corners. In a thermal domain, it is effective to have the conductive materials in metal-metal contact as well as metal-mold contact (via a resin in-fill) so that heat can be conducted. From a thermal transfer perspective, a spiral shaped channel would be effective as the heat can travel along the spiral.

Accordingly, one of the most effective channel shapes is a conductive layer under the polymer seal shape. Accordingly, in some embodiments a layer of metallic material in the shape of the cavity is used. The sharp corners can be curved out and the whole layer is connected so heat can travel around the whole layer.

Figure 5:
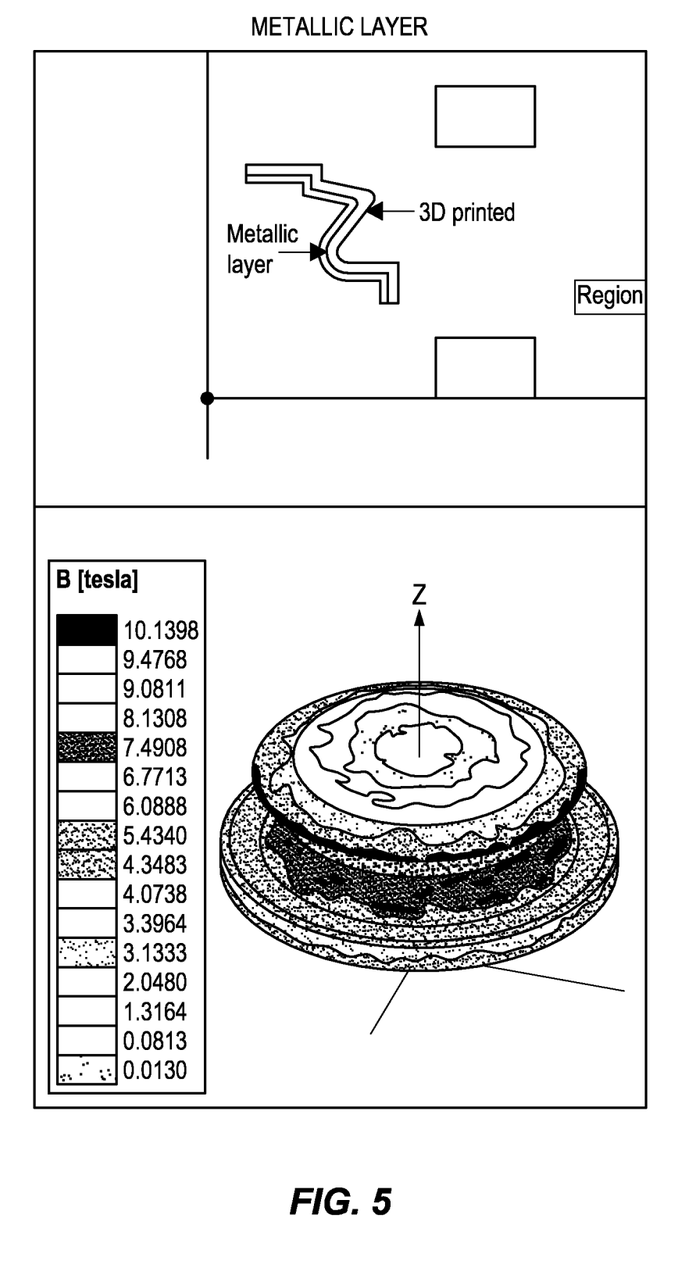
FIG. 5 illustrates the magnetic flux in a tooling design with a channel shaped in a layer around the surface of the part.

FIG. 5 illustrates the magnetic flux in a tooling design with a channel 22 shaped in a layer around the surface of the part 10.

Figure 6:
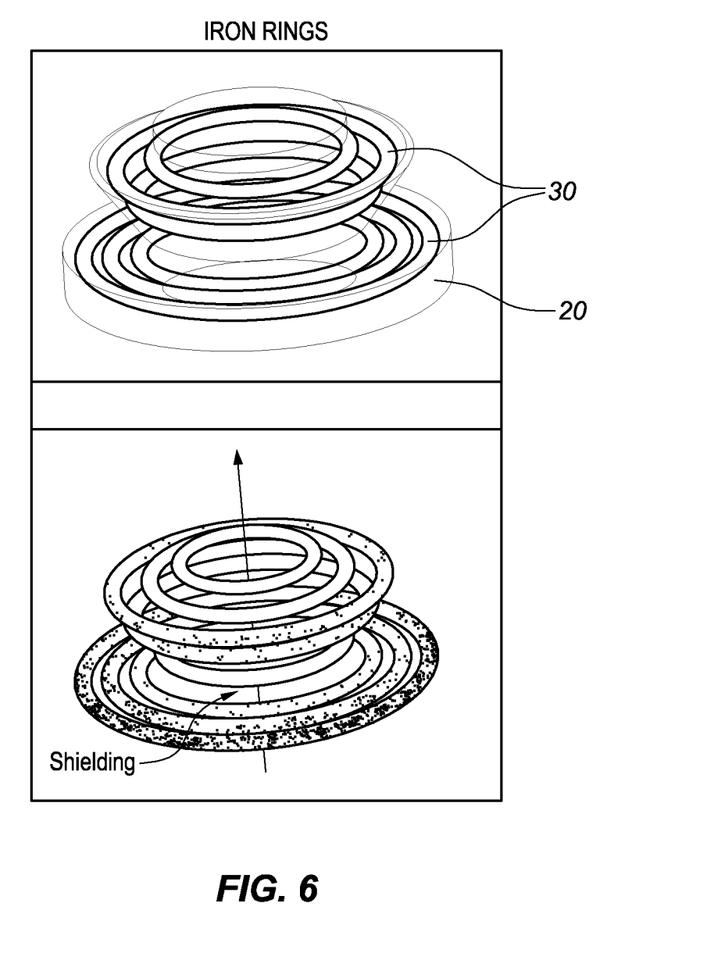
FIG. 6 illustrates the magnetic flux in a tooling design with channels shaped as one or more rings.

FIG. 6 illustrates the magnetic flux in a tooling design with channels 22 shaped as one or more rings 30. One or more rings 30 can be used. In preferred embodiments, one or more rings 30 are used on each half of the tooling 20. Ideally, one or more rings 30 is/are placed above the part 10 on each half of the tooling 20. In some embodiments, one or more rings 30 may surround the part 10 such that the entire part is within the circumference of the ring 30. In yet other embodiments, one or more rings 30 may both surround the part 10 and be placed above the part 10. In still yet other embodiments, concentric rings 30 of a decreasing diameter may be nested above and below the part 10. Other configurations of rings 30 may also be used.

Figure 7:
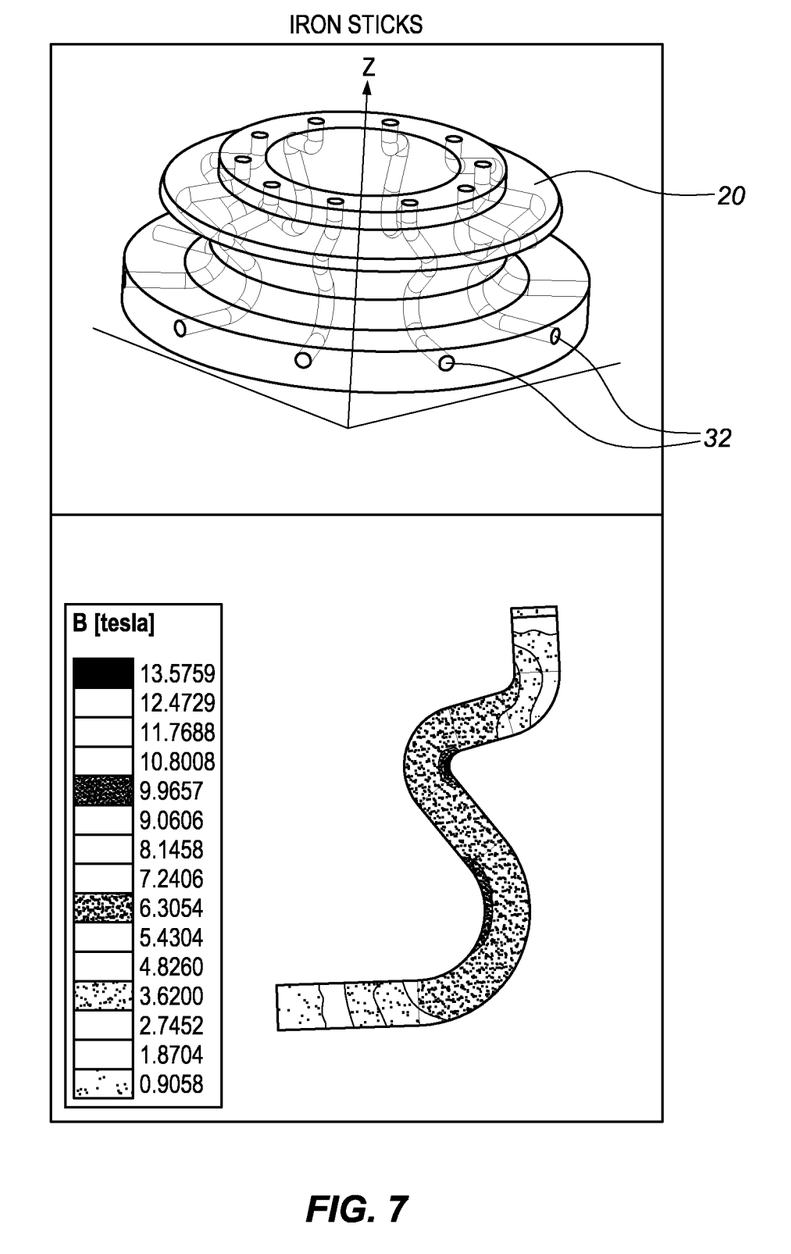
FIG. 7 illustrates the magnetic flux in a tooling design with channels shaped as a plurality of vertical paths.

FIG. 7 illustrates the magnetic flux in a tooling design with channels 22 shaped as a plurality of vertical paths 32. In the embodiment of FIG. 7, the vertical paths 32 run generally parallel to the direction of the applied pressure from the compression mold apparatus. To this end, the vertical paths 32 may cross over the halves of the tooling 20. In some embodiments, the tooling 20 may be made from a single piece or one main piece and a smaller compression piece to allow the vertical paths 32 to be continuous in the tooling 20. As may be appreciated, from FIG. 7, the vertical paths 32 are designed to follow the contour of the part 10.

As one can see in FIG. 7, the hot spot is created where the tightest radius occurs on the vertical path 32. As previously mentioned, for this reason, it may be advantageous to try and design channels 22 with uniform curvatures to promote uniform heating of the part 10.

Figure 8:
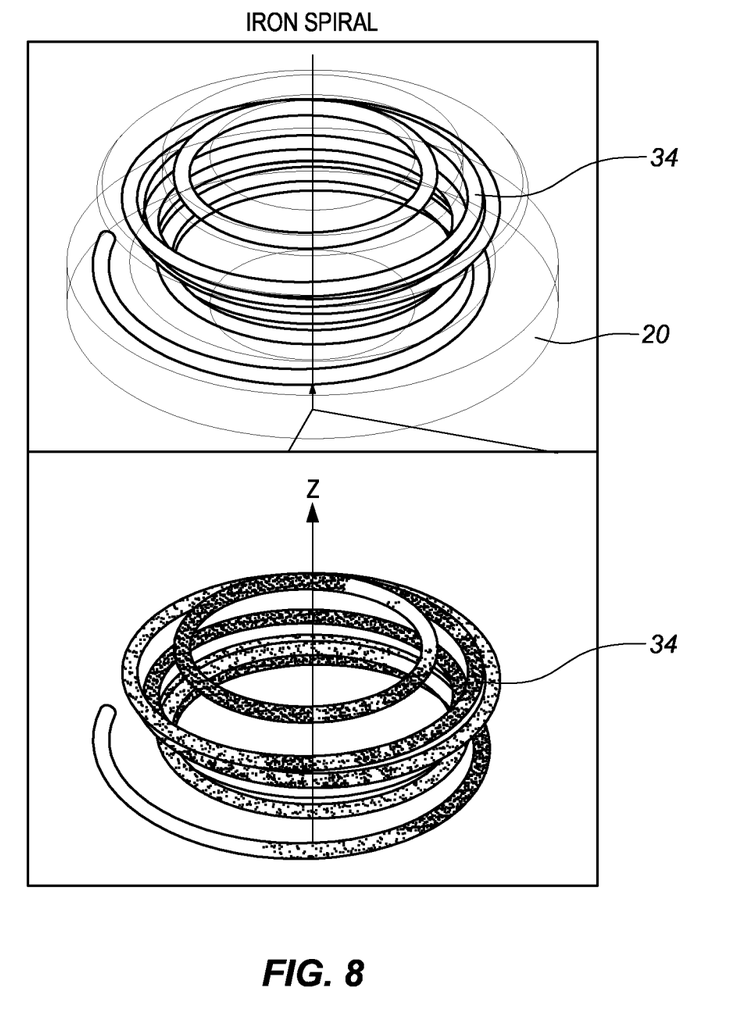
FIG. 8 illustrates the magnetic flux in a tooling design with a channel shaped as one continuous spiral.

FIG. 8 illustrates the magnetic flux in a tooling design with a channel 22 shaped as one continuous spiral 34. In preferred embodiments a single spiral 34 is used to allow the conduction of heat throughout the entire spiral 34 and tooling 20. However, in other embodiments, multiple spirals 34 may be used. In preferred embodiments, the entire spiral 34 is contained in a single piece of tooling and a second piece of tooling with no channels 22 is used to complete the mold portion and for the compression. In other embodiments, the mold is divided in half as would be typical, and a spiral 34 is contained in each half of the tooling 20.

Ideally, the spiral 34 starts above the part 10 and creates one or more concentric loops of expanding radius above the part and then continues on to surround the part 10 and then continues on further to be below the part 10 with one or more concentric rings. The overall spiral design 34 may be thought of as very similar to the ring design except the spiral is one continuous ring, which promotes better heat transfer.

Although a number of channel configurations have been described, any channel 22 design may be used. As discussed herein, reducing sharp angles or points helps negate hot spots and using a continuous pathway 22 design, like a spiral, helps promote better heat propagation. However, channel 22 designs are not limited to large radius spirals and can take on any shape that responds to the EMF created by the device.

In some embodiments, multiple electromagnetic coils can be employed in the platen or mold system in order to provide a range of heating options (from more than one source) so that heating can be 'scheduled' to different areas of a mold over time. In some embodiments, the induction could be mounted in the tool as well or instead of the press.

Figure 9:
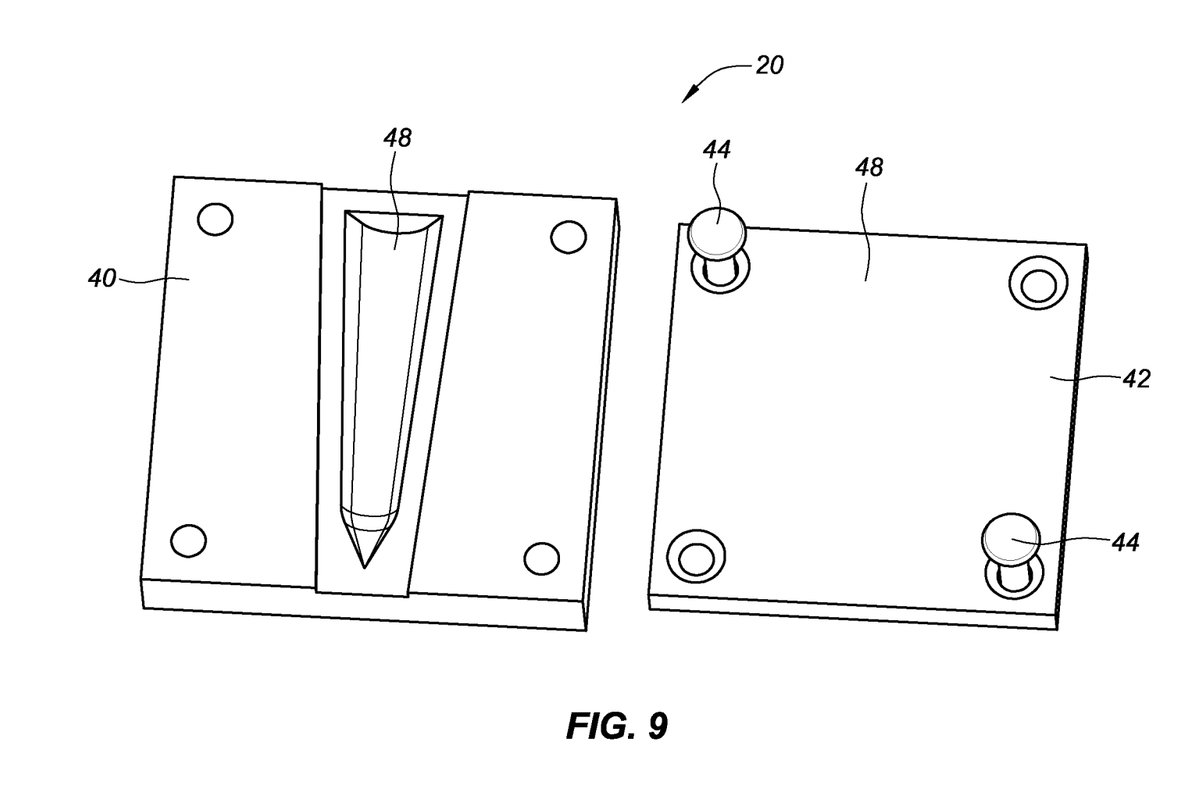
FIG. 9 illustrates an outside view of induction heated tooling separated into two complimentary halves.

FIG. 9 illustrates an inside view of the induction heated tooling 20 separated into two complimentary halves 40 and 42. As may be appreciated, a majority, and in this embodiment, substantially most of, the mold 48 is contained in the half 40 that includes the channels 22. The mold shown in FIG. 9 was used to cure polymer. The mold channels were filled with iron filings mixed with epoxy resin. The tool was filled by an opening to the side of the tool which allowed the iron filing mixture to be poured into the channel. Silicone was placed into the mold cavity 48 and the plastic bolts clamped the tool together. As may be appreciated, the fasteners for the two halves of the mold may also be non-metallic to prevent unwanted magnetic flux.

The embodiment of the induction heated tooling 20 shown in FIG. 9 was 3D printed. The channels 22 were formed under the part 10 or mold area 48. The part 10 designed to be produced by the tooling 20 was a conical shaped silicone polymer seal.

Testing of the embodiment of an induction heated tooling 20 shown in FIG. 9 demonstrated that with the correct induction coil, iron filings in epoxy resin can be heated to 165° C. in 25 seconds. The surface temperature of the test article was uniform despite a different shaped induction coil with a slightly different magnetic field. Testing proved that induction coil configuration is as important as the mold design. Testing showed that iron filing channels can be induction heated to cure polymer. The mould heated to 110° C. in 2 minutes. The testing highlighted that the conductive channels 22 should be the same distance to the surface of the mould cavity 48 throughout to allow uniform conduction of heat.

Testing further demonstrated that in order to fully cure the part 10, the induction coils (see 26 in FIG. 2) should fully cover the entire tooling 20, or the channels 22 at a minimum, to allow exposure to magnetic flux at all points of the part 10. Moreover, it is preferred that the channels 22 are designed to be a consistence distance from the surface of mold cavity 48.

Of course, should the designer wish a non-uniform temperature to be generated, the distance between the iron filing containing channels 22 and the surface of the mold cavity can be varied based on the thermal conductivity of the 3D printed material.

What is claimed is:

1. A method of curing a part in a mold comprising:
   placing a heat curable material in tooling made from a non-metallic material wherein the tooling includes a mold cavity that forms the part;
   creating an electro-magnetic field across the tooling using induction coils;
   applying pressure to the tooling; and
   induction heating a metallic material contained in channels formed in the tooling around the mold cavity of the part.

2. The method of claim 1, wherein the material is a silicone polymer.

3. The method of claim 1, wherein the tooling is manufactured using additive manufacturing.

4. The method of claim 1, wherein the metallic material is iron filings.

5. The method of claim 4, wherein the iron filings are mixed with an epoxy resin.

6. The method of claim 1, wherein the tooling is made from Polyether Imide.

7. The method of claim 1, wherein the channels are a continuous spiral.

8. The method of claim 1, wherein the channels are conformal to surface of the mold cavity of the part.

9. The method of claim 1, wherein the tooling is comprised of multiple pieces and one piece has all the channels.

10. A method of curing a part in a mold comprising:
    placing a heat curable material in tooling made from plastic wherein the tooling includes a mold cavity that forms the part;
    creating an electro-magnetic field across the tooling using induction coils;
    applying pressure to the tooling; and
    heating a metallic material contained in channels formed in the tooling around the mold cavity of the part.

11. The method of claim 10, wherein the material is a silicone polymer.

12. The method of claim 10, wherein the tooling is manufactured using additive manufacturing.

13. The method of claim 10, wherein the metallic material is iron filings.

14. The method of claim 13, wherein the iron filings are cast with an epoxy resin.

15. The method of claim 10, wherein the tooling is made from Polyether Imide.

16. The method of claim 10, wherein the channels are placed on one side of the part only.

17. The method of claim 10, wherein the channels are one continuous spiral.

18. The method of claim 10, wherein the tooling is comprised of two halves and one half has all the channels.

* * * * *